(12) United States Patent
Engel

(10) Patent No.: US 12,118,657 B2
(45) Date of Patent: Oct. 15, 2024

(54) METHOD AND DEVICE FOR VISUALIZATION OF THREE-DIMENSIONAL OBJECTS

(71) Applicant: Siemens Healthcare GmbH, Erlangen (DE)

(72) Inventor: Klaus Engel, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 448 days.

(21) Appl. No.: 17/388,123

(22) Filed: Jul. 29, 2021

(65) Prior Publication Data
US 2022/0044472 A1 Feb. 10, 2022

(30) Foreign Application Priority Data
Aug. 7, 2020 (DE) ..................... 10 2020 210 030.6

(51) Int. Cl.
*G06T 15/08* (2011.01)
*G06T 5/20* (2006.01)
*G06T 15/06* (2011.01)

(52) U.S. Cl.
CPC ............... *G06T 15/08* (2013.01); *G06T 5/20* (2013.01); *G06T 15/06* (2013.01)

(58) Field of Classification Search
CPC ............ G06T 15/08; G06T 5/20; G06T 15/06
See application file for complete search history.

(56) References Cited

U.S. PATENT DOCUMENTS

| 7,098,915 B2 | 8/2006 | Appolloni |
| 11,315,327 B1* | 4/2022 | Seiler ............... G02B 27/0093 |
| 2008/0024515 A1* | 1/2008 | Yang ..................... G06T 15/06 |
| | | 345/592 |

(Continued)

FOREIGN PATENT DOCUMENTS

EP 3178068 B1 6/2017

OTHER PUBLICATIONS

Koskela et al., Foveated Path Tracing a Literature Review and a Performance Gain Analysis, pp. 10 (Year: 2016).*

(Continued)

*Primary Examiner* — Phuc N Doan
(74) *Attorney, Agent, or Firm* — Harness, Dickey & Pierce, P.L.C.

(57) ABSTRACT

A computer-implemented method is for visualization of a three-dimensional object represented by volume data for a user in the form of a two-dimensional visualization image including a plurality of visualization pixels. In an embodiment, the method includes: providing an image synthesis algorithm designed for visualization of the three-dimensional object by mapping the volume data onto the visualization pixels; detecting an instantaneous viewing direction of the user; determining a focus area defined as a region of the visualization image, upon which the user focuses based upon the instantaneous viewing direction; adjusting the image synthesis algorithm such that the computing effort required for the mapping for visualization pixels outside of the focus area is lower than for visualization pixels inside of the focus area; and mapping volume data onto the visualization pixels with the adjusted image synthesis algorithm.

21 Claims, 6 Drawing Sheets

(56) References Cited

U.S. PATENT DOCUMENTS

2017/0294042 A1* 10/2017 Engel .................... G06T 15/08

OTHER PUBLICATIONS

Bruder, V., et al., "Voronoi-Based Foveated Volume Rendering", EUROVIS, DOI: 10.2312/evs.20191172, 2019.

Anonymous:; "Augenbewegung"; Wikipedia, Die freie Enzyklopädie; URL: https://de.wikipedia.org/w/index.php?title=Augenbewegung&oldid=196345119 [abgerufen am Apr. 29, 2021; 2020.

Display of surfaces from volume data Levoy; Marc Levoy; Display of surfaces from volume data Levoy; IEEE Computer Graphics and Applications, 8(5):29-37; 1988.

Anonymous:; "Bildbearbeitung"; Wikipedia, Die freie Enzyklopädie; URL: https://de.wikipedia.org/w/index.php?title=Bildbearbeitung&oldid=198416232; 2020.

Guenter, B. et. al., "Foveated 3D Graphics", https://www.microsoft.com/en-us/research/wp-content/uploads/2012/11/foveated_final15.pdf, 2012.

Kajiya et al.:"The rendering equation", ACM SIGGRAPH Computer Graphics, Ausgabe 20, Nr. 4, Aug. 1986, Seiten 143-150).

Anonymous:; "Path Tracing"; Wikipedia, Die freie Enzyklopädie; URL: https://en.wikipedia.org/w/index.php?title=Path_tracing&oldid=956140135; 2020.

German Office Action dated Apr. 30, 2021.

* cited by examiner

METHOD AND DEVICE FOR VISUALIZATION OF THREE-DIMENSIONAL OBJECTS

Priority Statement

The present application hereby claims priority under 35 U.S.C. § 119 to German patent application number DE 102020210030.6 filed Aug. 7, 2020, the entire contents of which are hereby incorporated herein by reference.

FIELD

Example embodiments of the invention generally relate to the field of volume rendering, in other words, the representation or visualization of three-dimensional bodies or objects.

BACKGROUND

The modelling, reconstruction or visualization of three-dimensional objects has a broad field of application in the fields of medicine (for example CT, PET), physics (for example electron structure of large molecules) or geophysics (characteristics and situation of earth's layers). Typically, the object to be examined is irradiated (for example by way of electromagnetic waves or sound waves) in order to examine its characteristics. The scattered radiation is detected and properties of the body are determined from the detected values. Conventionally, the result consists in a physical variable (for example density, tissue type, elasticity, speed), whose value is determined for the body. As a rule, a virtual grid is used at whose grid points the value of the variable is determined. These grid points are conventionally referred to as voxels. The term "voxel" is a portmanteau formed from the terms "volume" and "pixel". A voxel corresponds to the spatial coordinates of a grid point, which is associated with the value of a variable at this location. This is usually a physical variable, which can be represented as a scalar or vectorial field, in other words, the spatial coordinate is associated with the corresponding field value. By interpolation of the voxels it is possible to obtain the value of the variable or of the field at any object points (in other words, at any locations of the object being examined).

For visualization of the volume data, a three-dimensional representation of the object or body being examined is generated on a two-dimensional display area (for example a screen or a panel or lens of what are known as "augmented reality glasses") from the voxels. In other words, voxels (defined in three dimensions) are mapped onto pixels (defined in two dimensions) of a two-dimensional visualization image. The pixels of the visualization image will also be referred to as visualization pixels below. The mapping is conventionally referred to as volume rendering. Implementation of the volume rendering depends on how information contained in the voxels is rendered by way of the pixels.

One of the methods of volume rendering used most often is what is known as ray casting (cf. Levoy: "Display of Surfaces from Volume Data", IEEE Computer Graphics and Applications, issue 8, No. 3, May 1988, pages 29-37). With ray casting, simulated rays, which issue from the eye of an imaginary observer, are sent by the body or object being examined. Along the rays, RGBA values are determined from the voxels for sampling points and combined to form pixels for a two-dimensional image by way of Alpha Compositing or Alpha Blending. In the expression RGBA, the letters R, G and B stand for the color fractions red, green and blue, of which the color contribution of the corresponding sampling point is composed. A stands for the ALPHA value, which is a measure of the transparency at the sampling point. The respective transparency is used in the overlaying of RGB values at sampling points relating to the pixel. Lighting effects are conventionally taken into account by way of a lighting model in the context of a method referred to as "shading".

A further method of volume rendering is what is known as path tracing (cf. Kajiya: "The rendering equation", ACM SIGGRAPH Computer Graphics, issue 20, No. 4, August 1986, pages 143-150). In this case, a plurality of simulated rays per visualization pixel is shot into volume data, which then interact with the volume, in other words, are reflected, refracted or absorbed, with at least one random ray being generated each time (apart from in the case of absorption). Each simulated ray thus searches for a path through the volume data. The more virtual rays used per visualization pixel, the closer the ideal image is approximated. In particular, the methods described in EP 3 178 068 B1 can be applied here. The content of EP 3 178 068 B1 is incorporated herein in its entirety by way of reference.

A primary technical obstacle in the implementation of a system for interactive volume rendering is the fast, efficient and local processing of large volumes of data. It is precisely on devices with limited computing or graphics power that fast volume rendering is a challenge. Examples of such devices are mobile devices such as smartphones or tablets or also "stand-alone" augmented, mixed or virtual reality devices (such as augmented reality glasses, which reflect a visualization image onto a lens in the field of view of a user). These are usually fitted with power-saving processors ("system on a chip"), which, compared to modern PCs, have relatively low computing power. Since high image repetition rates, usually 60 Hz, 90 Hz or even 120/144 Hz, are also necessary for augmented, mixed and virtual reality applications, such systems quickly reach the limits of their computing powers if it is a matter of mapping volume data onto a visualization image in realtime. This is relevant, in particular, in medical imaging in which very large volume data sets regularly occur. For example, typical CT machines from Siemens Healthineers® can generate a volume data set with a magnitude of 512×512×4096. The capacity for visualization of data sets of this kind and high image quality assists medical experts with diagnosis.

SUMMARY

The inventors have discovered, however, owing to the limited computing power of many visualization systems, the image repetition rate is limited, and this often greatly restricts the practical use and the interactivity of existing solutions. While the image repetition rate can be improved by reducing the effort on calculation of the visualization image, the quality of the visualization for the notified purpose, for instance the diagnosis of a medical image data set, is then frequently no longer sufficient.

It is an aim of embodiments of the present invention, therefore to provide improved methods and devices in this regard for visualization of volume data. In particular, at least one embodiment should address the problem in which the visualization of volume data enables shorter calculation times for visualization images with simultaneously acceptable quality in order to thereby achieve, for example also on those devices with power-saving processors, high image repetition rates.

Embodiments of the invention are directed to a method, a device, a computer program product and a computer-readable storage medium. Advantageous developments are disclosed in the claims.

Hereinafter embodiment of the inventive will be described both in relation to the devices and in relation to the method. Features, advantages or alternative embodiments mentioned here should similarly also be transferred to the other claimed subject matters, and vice versa. In other words, the concrete claims (which are directed, for example, to a device) can also be developed with the features, which are described or claimed in connection with a method. The corresponding functional features of the method are formed by corresponding concrete modules.

Furthermore, embodiments are described both in relation to methods and devices for visualization of a three-dimensional body and in relation to methods and devices for adjusting trained functions. Here features and alternative embodiments of data structures and/or functions in methods and devices for determination can be transferred to analogous data structures and/or functions in methods and devices for adjusting. Analogous data structures can be identified here in particular by the use of the prefix "training". Furthermore, the trained functions used in methods and devices for visualization of a three-dimensional body can have been adjusted and/or provided in particular by methods and devices for adjusting trained functions.

According to one embodiment of the invention, a computer-implemented method for visualization of a three-dimensional object represented by volume data (in other words, for volume rendering of the three-dimensional object) is achieved for a user in the form of a two-dimensional visualization image comprising a plurality of visualization pixels. Firstly, the method includes the step of providing an image synthesis algorithm, which is designed for visualization of the three-dimensional object by mapping the volume data onto the visualization pixels. A next step comprises detecting the instantaneous viewing direction of the user relative to the visualization image. Building on this, in a further step, a focus area is determined, wherein the focus area is defined as a region of the visualization image, which the user focuses on based upon the instantaneous viewing direction. As a further step the method comprises adjusting the image synthesis algorithm in such a way that the computing effort for visualization pixels outside of the focus area is lower than for visualization pixels inside of the focus area. Finally, a step of mapping the volume data onto the visualization pixels takes place with the adjusted image synthesis algorithm.

According to a further embodiment, a computer-implemented method for providing a trained function for improvement of a two-dimensional visualization image comprising a plurality of visualization pixels is provided. The method comprises:

providing training input data, wherein the training input data has a first visualization image of a three-dimensional object, which first visualization image was generated based upon volume data by an image synthesis algorithm with a first total computing effort, which volume data represents the three-dimensional object;

providing training output data, wherein the training output data has a second visualization image of the three-dimensional object, which second visualization image was generated based upon the volume data by the image synthesis algorithm with a second total computing effort, wherein the first total computing effort is lower than the second total computing effort;

generating an improved visualization image by applying the trained function to the training input data;

comparing the improved visualization image with the training output data; and adjusting the trained function based upon the comparison.

According to a further embodiment, a training system for providing a trained function is provided, which is designed to carry out one or more method step(s) of an embodiment of the method for providing a trained function.

According to a further embodiment, a visualization device for visualization of a three-dimensional object represented by volume data is provided, wherein the visualization takes place for a user in the form of a two-dimensional visualization image comprising a plurality of visualization pixels. The device has an interface and an arithmetic unit. The interface is designed for receiving the volume data and detection information, which detection information includes information about the instantaneous viewing direction of the user. The arithmetic unit is designed to determine a focus area based upon the detection information, with the focus area being defined as a region of the visualization image, which the user focuses on. The arithmetic unit is also designed to map the volume data for creation of the visualization image onto the visualization pixels and to adjust the mapping in such a way that the computing effort for visualization pixels outside of the focus area is lower than for visualization pixels inside of the focus area.

According to a further embodiment, a visualization system is provided, which has the visualization device for visualization of a three-dimensional object represented by volume data. Furthermore, the visualization system has a detection device, which is designed to detect the detection information and provide it to the arithmetic unit via the interface.

The invention relates in a further embodiment to a computer program product, which comprises a program and which can be loaded directly into a storage device of a programmable arithmetic unit and has program code/segments, for example libraries and help functions, in order to carry out a method for visualization of a three-dimensional object in particular according to an embodiment when the computer program product is run.

Furthermore, the invention relates in a further embodiment to a computer program product, which comprises a program and which can be loaded directly into a storage device of a programmable arithmetic unit and has program code/segments, for example libraries and help functions, in order to carry out a method for provision of a trained function in particular according to the embodiment when the computer program product is run.

The invention relates in a further embodiment to a computer-implemented method for visualization of a three-dimensional object represented by volume data for a user in a form of a two-dimensional visualization image including a plurality of visualization pixels, the method comprising:

providing an image synthesis algorithm designed for visualization of the three-dimensional object by mapping the volume data onto the visualization pixels;

detecting an instantaneous viewing direction of the user;

determining a focus area defined as a region of the visualization image, which the user focuses on based upon the instantaneous viewing direction;

adjusting the image synthesis algorithm such that computing effort required for mapping for visualization pixels outside of the focus area is relatively lower than for visualization pixels inside of the focus area, to produce an adjusted image synthesis algorithm; and mapping the volume data onto the visualization pixels with the adjusted image synthesis algorithm.

The invention relates in a further embodiment to a visualization system for visualization of a three-dimensional object represented by volume data, the visualization taking place for a user in a form of a two-dimensional visualization image including a plurality of visualization pixels, the visualization system comprising:

an interface designed to receive the volume data and detection information, the detection information including information about an instantaneous viewing direction of the user; and an arithmetic unit designed to:
determine a focus area based upon the detection information, the focus area being defined as a region of the visualization image upon which the user focuses;
map the volume data for creation of the visualization image onto the visualization pixels and
adjust mapping such that computing effort for visualization pixels outside of the focus area is relatively lower than computing effort for visualization pixels inside of the focus area.

The invention relates in a further embodiment to a non-transitory computer program product storing a computer program, which can be loaded directly into a storage device of a visualization system, including program segments to carry out the method for visualization of a three-dimensional object of an embodiment when the program segments are run by the visualization system.

The invention relates in a further embodiment to a non-transitory computer-readable storage medium storing program segments, readable and runable by a visualization system, to carry out the method for visualization of a three-dimensional object of an embodiment when the program segments are run by the visualization system.

The invention relates in a further embodiment to a visualization system for visualization of a three-dimensional object represented by volume data, the visualization taking place for a user in a form of a two-dimensional visualization image including a plurality of visualization pixels, the visualization system comprising:

an interface to receive the volume data and detection information, the detection information including information about an instantaneous viewing direction of the user; and at least one processor to:
determine a focus area based upon the detection information, the focus area being defined as a region of the visualization image upon which the user focuses;
map the volume data for creation of the visualization image onto the visualization pixels and
adjust mapping such that computing effort for visualization pixels outside of the focus area is relatively lower than computing effort for visualization pixels inside of the focus area.

BRIEF DESCRIPTION OF THE DRAWINGS

Further characteristics and advantages of the invention will become obvious from the following explanations of example embodiments with reference to schematic drawings. Modifications mentioned in this connection can be combined with each other respectively in order to form new embodiments. Identical reference numerals will be used in different figures for identical features.

In the drawings.

DETAILED DESCRIPTION OF THE EXAMPLE EMBODIMENTS

Figure 1:
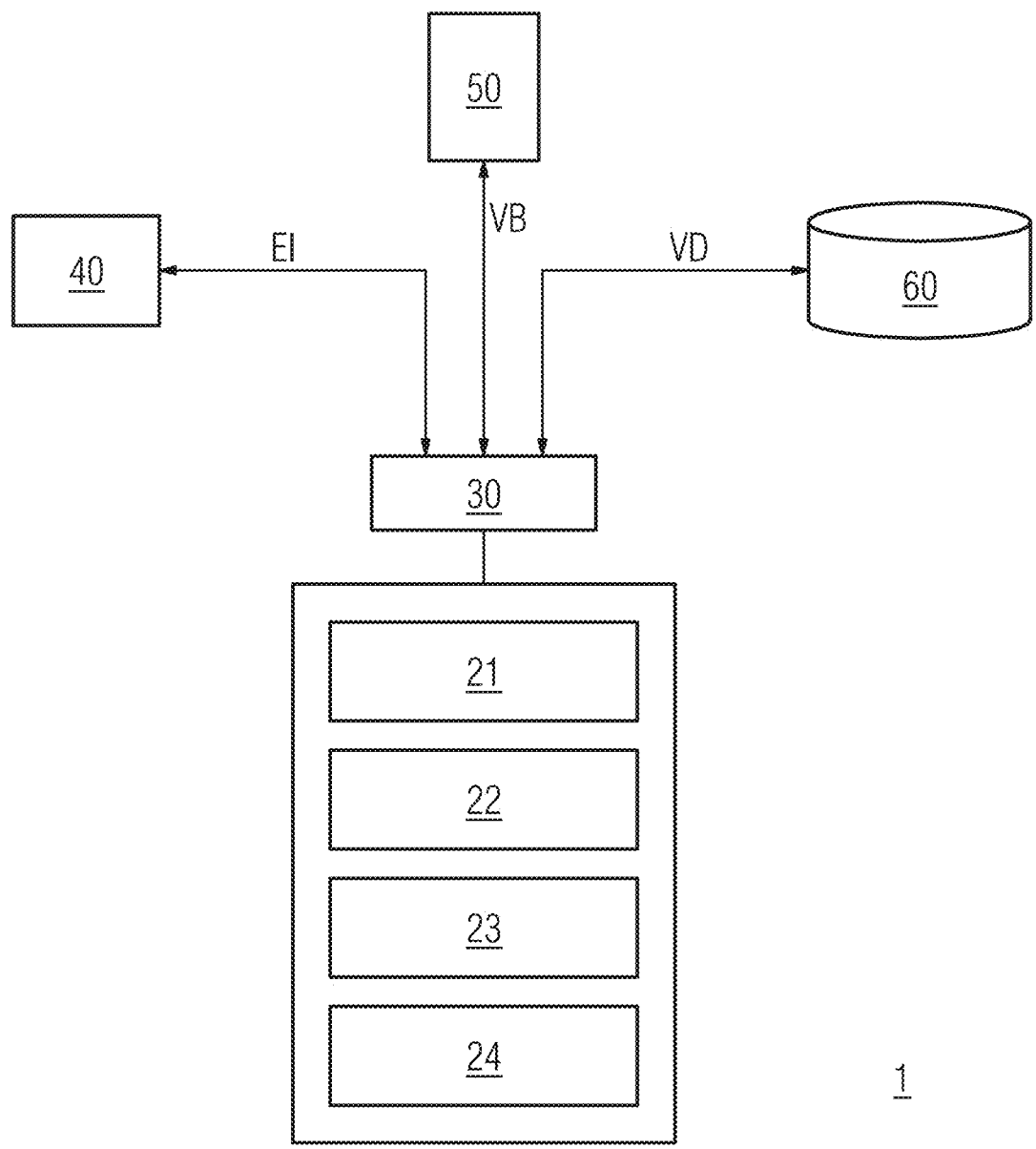
FIG. 1 shows a schematic representation of an embodiment of a system for visualization of a three-dimensional object.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to one embodiment of the invention, a computer-implemented method for visualization of a three-dimensional object represented by volume data (in other words, for volume rendering of the three-dimensional object) is achieved for a user in the form of a two-dimensional visualization image comprising a plurality of visualization pixels. Firstly, the method includes the step of providing an image synthesis algorithm, which is designed for visualization of the three-dimensional object by mapping the volume data onto the visualization pixels. A next step comprises detecting the instantaneous viewing direction of the user relative to the visualization image. Building on this, in a further step, a focus area is determined, wherein the focus area is defined as a region of the visualization image, which the user focuses on based upon the instantaneous viewing direction. As a further step the method comprises adjusting the image synthesis algorithm in such a way that the computing effort for visualization pixels outside of the focus area is lower than for visualization pixels inside of the focus area. Finally, a step of mapping the volume data onto the visualization pixels takes place with the adjusted image synthesis algorithm.

The volume data can include a plurality of voxels. A voxel ("volume pixel" or three-dimensional pixel) is a volume element, which represents a value on a regular grid in the three-dimensional space. Voxels are analogous to pixels, which represent two-dimensional image data. As with pixels, the voxels themselves do not typically include their position in the space (their coordinates); instead their coordinates are derived based upon their positions relative to other voxels (in other words, their positions in the data structure, which forms a single volume image). The value of a voxel can represent different physical properties of the three-dimensional object, such as a local density. In computed tomography scans (CT scans), the values are expressed, for example, in Hounsfield units, which represent the opacity of a mapped material in relation to X-rays. The volume data thereby describes a three-dimensional object in an object volume. In particular, the volume data can indicate a density (in particular inhomogeneous) of the three-dimensional object in the object volume.

The volume data can be provided, in particular, by a medical imaging method. The imaging methods can be based, for example, on radiography, computed tomography (CT), magnetic resonance tomography (MR), ultrasound and/or positron emission tomography (PET). Accordingly, the three-dimensional object can be a body or body part of a patient. The three-dimensional object can comprise one or more organ(s) of the patient.

The image synthesis algorithm can be understood, in particular, as a computer program product, which is designed for mapping the volume data onto a two-dimensional projection surface or for volume rendering of the three-dimensional body. The projection surface is given by the visualization image. The image synthesis algorithm can have program components in the form of one or more instruction(s) for a processor for calculation of the visualization image. The visualization image is composed of a plurality of visualization pixels. The resolution of the visualization image in relation to the visualization pixels is, in particular, spatially constant or homogeneous or spatially uniform. Other terms for image synthesis algorithms are, for example "renderer", "render algorithm" or "volume renderer". The image synthesis algorithm can be provided, for example, in that it is held available in a storage device or is loaded into a working memory of a suitable data processing device or is generally made available for application.

The image synthesis algorithm can implement different methods for visualization of a volume data set individually or in combination. For example, the image synthesis algorithm can have a ray casting module and/or a path tracing module. The image synthesis algorithm maps the volume data onto the visualization pixels. Calculation of the mapping (in other words, a value for the respective visualization pixels) is associated for each visualization pixel with a computing effort which is all the higher, the higher the level of detail and the quality of the mapping generated by the image synthesis algorithm. The image synthesis algorithm is designed, in particular, in such a way that the computing effort for the visualization pixels (for each visualization pixel) can be dynamically set. In particular, the computing effort can be individually set for each visualization pixel. Due to the adjustment of the computing efforts per visualization pixel the total computing effort for creation of the visualization image can ultimately also be individually set.

The eye or pupil or head position of a user can be detected and evaluated, for example by a detection system, for detection of the instantaneous viewing direction of a user. The eye or pupil or head position can be detected, for example, by a camera system and evaluated in a suitable image evaluation algorithm. If this information is related to the position in which the visualization image is shown to the user it is possible to determine at which region or pixel of the visualization image the user is currently looking (focus area or focus pixel). A relationship of this kind can occur, for example, by way of suitable registering of the position of the visualization image with the position of the user and/or a detection system for detection of the instantaneous viewing direction of the user.

Determining the focus area can be based on determining a focus pixel from the visualization pixels, wherein the focus pixel is defined as the pixel to which the instantaneous viewing direction of the user is directed. The focus area can comprise solely the focus pixel or a region of a plurality of visualization pixels defined around the focus pixel.

The knowledge about the focus area can be used to selectively adjust the image synthesis algorithm to the extent that a high quality representation of the three-dimensional object can be achieved in the focus area, while the quality outside of the focus area is reduced. For this, the image synthesis algorithm is adjusted to the extent that the computing effort for visualization pixels inside of the focus area is greater than for visualization pixels outside of the focus area.

If the volume data set with the image synthesis algorithm adjusted in this way is mapped or the visualization image with the image synthesis algorithm adjusted in this way is calculated, a visualization image results, which has a first image quality in the focus area and outside of the focus area has a second image quality, which is lower than the first image quality. The low image quality can manifest itself—with the same resolution of the visualization pixels—in a lower level of detail in the mapping or in a reduction in the mapping effects taken into account during rendering.

In other words, when mapping the volume data set, computing power is saved precisely where it can be dispensed with for the user—namely in the regions of the visualization image, which the user is not focusing on anyway and at most perceives peripherally. The claimed method therewith manages the balancing act of providing the user with a high-quality visualization image and reducing the computing effort necessary for this. Conversely, this makes it possible to calculate the visualization images on portable terminals, which are inherently limited in terms of their computing power, and in the process achieve acceptable image repetition rates. With the requirements of image quality and image repetition rate the disclosed method thereby takes into account technical conditions, which lie outside of the terminal. Furthermore, technical conditions of the terminals are also taken into account, namely the frequently limited computing power.

According to one embodiment, the visualization image has a uniform spatial resolution of the visualization pixels. In other words, the visualization pixels, relative to the three-dimensional object to be mapped, have a uniform, spatially constant resolution. For adjustment of the computing effort on creation of the visualization image, the resolution of the visualization pixels is not adapted, therefore.

This has the advantage that the computing effort can be adjusted directly when rendering the volume data without visualization images with different resolutions having to be combined as a follow up. The transitions between the different quality stages can thereby be configured to be softer and to be less perceptible to the user.

According to one embodiment, in the step of adjusting, the image synthesis algorithm is adjusted in such a way that the computing effort decreases as a function of a distance from the focus area (or from the focus pixel).

The variation in the computing effort as a function of the distance creates a measure which is easily accessible during calculation, with which the computing effort can be reduced. The computing effort can continuously (or constantly) decrease as the distance from the focus area increases. For example, the image synthesis algorithm can be adjusted in such a way that the computing effort decreases linearly, quadratically, exponentially, etc. The continuous variation in the computing effort means that the reduction in the computing effort and associated loss in quality in peripheral regions, relative to the focus area, of the visualization image can be less perceptible to the user.

Alternatively, the image synthesis algorithm can also be set in such a way that the computing effort discontinuously decreases in one or more discrete stages as the distance from the focus area increases. In other words, one or more concentric regional rings (which do not necessarily have to be circular) can thus result in the visualization image. The regional rings then have a decreasing computing effort from the inside, in other words, starting from the focus area.

Compared to the continuous adjustment of the computing effort, a discontinuous variation of the computing effort of this kind can result, depending on image synthesis algorithm, in a simplified calculation and therewith a further reduction in the total computing effort.

Some embodiments will be disclosed below as to how an adjustment of the computing effort can be achieved as a function of the image processing algorithm used. The measures can be combined with each other in particular to enable a tailored adjustment of the computing effort.

According to one embodiment, the image synthesis algorithm has a first mapping algorithm and a second mapping algorithm different from the first mapping algorithm. "Different" can in this case mean, in particular, that the mapping algorithms build on different methods or principles, which sample volume data. The computing effort per pixel of the first mapping algorithm can be, in particular, systematically higher than the computing effort per pixel of the second mapping algorithm. In general, the first mapping algorithm will thereby also deliver a better image quality than the second mapping algorithm. In the step of adjusting it is accordingly provided to note the first mapping algorithm for mapping the volume data onto visualization pixels in the focus area and the second mapping algorithm for mapping for visualization pixels outside of the focus area. When mapping, the first mapping algorithm is used thereby for the focus area and the second mapping region is used for the region of the visualization image outside of the focus area. As a result, the higher quality (but more computing intensive) first mapping algorithm is used at least for the focus area being considered by the user, even if the available computing power does not permit an application to the entire visualization image. The first mapping algorithm can be implemented, in particular, as a path tracing method while the second mapping algorithm can be implemented as a ray casting method. The advantage of the path tracing method lies in that many global illumination effects, which are relevant to a realistic mapping of the volume data, are automatically taken into account by the multiple scattering and do not—as in the case of ray casting—have to be implemented separately. This applies, for example, for ambient occlusions or lighting effects due to extensive light sources.

According to one embodiment, the image synthesis algorithm is based on tracing simulated rays in the object volume spanned by the volume data, and adjusting the image synthesis algorithm comprises adjusting a rate at which the object volume is sampled along the simulated rays (what is known as the sampling rate).

Example image synthesis algorithms, which are based on tracing simulated rays through an object volume, are ray casting or path tracing methods. The sampling frequency in the ray casting method determines the spatial frequency of the sampling points in the object volume. The higher the sampling frequency, the more points in the object volume are sampled for a visualization pixel. The more points that are sampled, the better the quality of the mapping (or in other words, the image quality) is and the greater the computing effort is per visualization pixel also, however.

With path tracing, the sampling frequency can be understood as a relative measure of the spatial frequency of scatter events ("bounces") in the object volume. The sampling frequency refers therewith both to the initial simulated rays "shot" into the volume and to the simulated scattered rays. The following applies here too: the higher the sampling frequency, the better the quality of the mapping and the greater the computing effort is per visualization pixel.

In particular, the sampling frequency can be (continuously or discontinuously) reduced for each visualization pixel as a function of the distance of the respective visualization pixel from the focus area, in particular through to a minimal sampling frequency.

For the image synthesis algorithms, the sampling frequency represents a very efficient, easy-to-control parameter for influencing the computing effort on calculation of the visualization image. The optional definition of a minimum sampling frequency ensures that a minimum quality is not fallen below.

According to one embodiment, a plurality of different visualization modules are implemented in the image synthesis algorithm, which different visualization modules take into account in each case different mapping effects when mapping the volume data, wherein the visualization modules are implemented, in particular, in such a way that their respective contributions to the computing effort per visualization pixel can be individually adjusted and/or that the visualization modules can be individually activated and deactivated. In the step of adjusting, the respective contributions to the computing efforts are then selectively adjusted for the individual visualization modules/mapping effects and/or the individual visualization modules are selectively activated and/or deactivated.

"Implemented" can mean, in particular, that the image synthesis algorithm has components and/or program elements, which allow the calculation of the associated mapping effect. An adjustment of the contribution to the computing effort is accompanied by the adjustment in the quality of the mapping effect. The mapping effects can be selected, for example, from ambient occlusion, shadows, translucence, color bleeding, surface shading, complex camera effects and/or illumination by any ambient light conditions. It is possible to react flexibly to the available computing power and the required image repetition rate due to the selective adjusting or (de)activating of individual mapping effects.

According to one embodiment, in each case a prioritization (for example in the form of a ranking or order) is allocated to the visualization modules (for example, by way of a step of prioritizing the mapping effects), wherein in the step of adjusting, selective adjusting and/or activating and/or deactivating takes place based upon the prioritization.

In particular, adjusting can take place in such a way that the quality of higher priority mapping effects (for example shadings) is set higher than the lower priority mapping effects (for example color bleeding). The step of prioritizing can be taken to mean that for the mapping effects, an order is created based upon how strongly a possible loss of quality influences user perception.

As a result of the prioritization of the mapping effects the mapping effects more relevant to user perception can be afforded preferential treatment compared to less relevant mapping effects. If the computing effort has to be reduced, the quality of higher priority mapping effects can be reduced less strongly, for example, than the lower priority mapping effects.

According to one embodiment, a visualization module is implemented in the image synthesis algorithm to take into account the mapping effect of the ambient occlusion, wherein adjusting the image synthesis algorithm comprises adjusting the computing effort when taking into account the ambient occlusion.

In the literature the effect of ambient occlusion is also referred to as "ambient occlusion". To take account of the ambient occlusion, for example in the case of ray casting, a plurality of ambient occlusion test rays can be emitted for each sampling point in order to determine whether an ambient occlusion is present. Adjusting the computing effort when taking into account the ambient occlusion can comprise, in particular, adjusting the number of ambient occlusion test rays.

According to one embodiment, the image synthesis algorithm has a path tracing algorithm, wherein in the step of adjusting, a number of scatter events per simulated ray is adjusted.

The number of scatter events can be influenced, for example, by the number of Monte Carlo iterations, by a premature termination of the scattered rays on reaching the opacity threshold or a definition of a maximum number of scatter events. The computing effort in path tracing methods can be effectively adjusted by way of the adjustment of the number of scatter events.

Alternatively or in addition, the step of adjusting can comprise adjusting the number of simulated rays, which are sampled in path tracing for a visualization pixel. The more rays that are taken into account, the better the quality of the mapping and the greater the computing effort.

According to one embodiment, the image synthesis algorithm has a ray casting algorithm, wherein in the step of adjusting, the number of shadow rays is adjusted.

With ray casting, illumination effects per sampling point are calculated by emitting illuminating or shadow rays, which connect the sampling point to a point on a light source. Since this connection can be hidden by an object or can lead through opalescent medium, these are conventionally referred to as shadow rays. The greater the number of these shadow rays, the more realistic the reproduction of the local lighting effects and the more realistic the value assigned to the associated visualization pixel. However, the number of sampled shadow rays also increases the computing effort. For this reason, adjusting the number of shadow rays in ray casting systems is an effective parameter for adjusting the computing effort.

According to one embodiment, adjusting the image synthesis algorithm comprises adjusting the shading quality.

In this case, shading means that color values and permeability values are associated with the individual points with the aid of a lighting model. This applies to the sampling points in ray casting and to the scatter points in path tracing. Transmitted and reflected fractions have to be calculated in order to calculate the color and permeability values. A calculation of surface normals is necessary for this. For this, the local gradient of the density of the three-dimensional object is calculated based upon the volume data. In particular, if only slight variations are present in the properties of the body, the quality of the calculation of the gradient (this is also referred to here as the gradient quality) has a great effect on the shading quality. The shading quality can consequently be adjusted by adjusting the gradient quality for shading calculations. In particular, the shading quality can be adjusted in such a way that the gradient quality for visualization pixels decreases as the distance from the focus area increases. The higher the gradient quality, the higher, as a rule, the computing effort also is for calculation of the gradient. In the gradient calculation, central differences, for example, provide a better statement about the local slopes than simple forward differences but are more computing-intensive. In order to improve the gradient quality further, higher orders can be taken into account in the calculation of finite differences, although this increases the computing effort still further. The adjustment of the shading or gradient quality is an effective possibility for adjusting the computing power per visualization pixel.

According to one embodiment, the method also comprises adapting the resolution of the volume data in such a way that in the step of mapping, a lower resolution of the volume data is used for visualization pixels outside of the focus area than for visualization pixels inside of the focus area.

The volume data can be held in readiness in different resolution stages (what is known as mipmapping). For the focus area, a high resolution stage of the volume data is sampled, whereas for regions outside of the focus area, lower resolution stages are used. The use of different resolutions for the volume data does not have any effect on the resolution of the visualization image. The object volume as such can be mapped onto a spatially constant distribution of visualization pixels, however the object information is resolved to different extents according to region of the visualization image. If the resolution of the volume data reduces, the number of voxels per volume element is reduced in other words. The result is automatically fewer opportunities for interaction of the simulated rays, whereby the computing effort reduces. The computing effort may be effectively reduced by a suitable choice of mipmap stages.

According to one embodiment, the method also includes the step of determining a time budget and/or an available computing power for creating the visualization image, wherein the step of adjusting takes place by taking into account the time budget and/or the available computing power.

In other words, the computing effort per visualization pixel is thus selectively adjusted to the available time budget and/or the computing power. As a result, the available computing power can be optimally utilized. This can ensure, in particular, that the imaging quality is not reduced unnecessarily. The available computing power can be understood as the instantaneously free computing power of the device which carries out the computer-implemented method. The available computing power can be provided by querying the instantaneous system resources (for example processor and/or working memory utilization). The time budget can be given by the boundary conditions for the representation of the mapping for the user. These boundary conditions can be given, for example, by a minimum image repetition rate. If, for example 60 frames per second are displayed (60 Hz representation), a new frame has to be calculated at least every 16 milliseconds. The time budget is 16 milliseconds, therefore. For a 100 Hz representation, the time budget is 10 milliseconds. For a 144 Hz representation, the time budget is around 7 milliseconds. If for stereoscopic representations, such as with augmented reality glasses, two individual images per frame have to be calculated, the time budget for a 60 Hz representation is 8 milliseconds and 3.5 milliseconds for a 144 Hz representation. According to one embodiment, the time budget lies between 3.5 milliseconds and 42 milliseconds and in particular between 7 milliseconds and 16 milliseconds.

According to one embodiment, the method also includes the step of applying a filter algorithm to the visualization image.

By applying a filter algorithm, losses in quality outside of the focus area can be at least partially compensated with comparatively low computing effort. Furthermore, transitions between regions of the visualization image with different qualities or level of detail can be smoothed. Gaussian filters, low-pass filters, bilinear filters or combinations of the filters, for example, can be used as the filter algorithm. According to one embodiment, the image filter is applied to the entire visualization image, in other words to all regions. According to a further embodiment, the image filter is applied only to regions outside of the focus area.

According to one embodiment, the method also has the step of generating an improved visualization image by applying a trained function to the visualization image, wherein the trained function is configured in such a way that it improves the image quality of the visualization image in particular by a correction of the effects of adjusting the image synthesis algorithm.

In other words, a trained function is applied to the visualization image, therefore. Generally, a trained function maps input data onto output data. The output data can, in particular, continue to depend on one or more parameter(s) of the trained function. The one or more parameter(s) of the trained function can be determined and/or adjusted by training. Determining and/or adjusting the one parameter or the plurality of parameters of the trained function can be based, in particular, on a pair of training input data and associated training output data, with the trained function being applied to the training input data for generation of training mapping data. In particular, determining and/or adjusting can be based on a comparison of the training mapping data and the training output data. In general, a trainable function, in other words, a function with parameters that have not yet been adjusted, is referred to as a trained function.

Other terms for trained function are trained mapping rule, mapping rule with trained parameters, function with trained parameters, algorithm based on artificial intelligence, machine learning algorithm. An example of a trained function is an artificial neural network. Instead of the term "neural network" the term "neuronal network" can also be used. A neural network is fundamentally constructed like a biological neural network such as a human brain. In particular, an artificial neural network comprises an input layer and an output layer. It can also comprise a plurality of layers between input and output layers. Each layer comprises at least one, preferably a plurality of node(s). Each node can be understood as a biological processing unit, for example as a neuron. In other words, each neuron corresponds to one operation, which is applied to input data. Nodes of one layer can be connected by edges or connections to nodes of different layers, in particular by directional edges or connections. These edges or connections define the flow of data between the nodes of the network. The edges or connections are associated with a parameter, which is frequently referred to as "weight" or "edge weight". This parameter can regulate the importance of the output of a first node for the input of a second node, with the first node and the second node being connected by an edge.

In particular, a neural network can be trained. In particular, the training of a neural network is carried out based upon the training input data and the associated training output data according to a "supervised" learning technique ("supervised learning"), with the known training input data being input into the neural network and the output data generated by the network being compared with the associated training output data. The artificial neural network learns and adjusts the edge weights for the individual nodes independently as long as the output data of the last network layer does not adequately correspond to the training output data.

In particular, a trained function can also be a deep neural network (or "deep artificial neural network"). According to one embodiment, the trained function can be, in particular, what is known as an image-to-image neural network, in other words, a neural network, which maps image data onto image data. The input data would then be the visualization image and the output data would be the improved visualization image. For example, a convolutional neural network or a deep convolutional neural network can be used. The neural network has one or more convolutional layer(s) and one or more deconvolutional layer(s). In particular, the neural network can comprise a pooling layer.

Through the use of convolutional layers and/or deconvolutional layers, a neural network can be particularly efficiently used for image processing since, despite many connections between node layers, only a few edge weights (namely the edge weights corresponding to the values of the convolutional core) have to be determined by training. With an identical number of training data, the accuracy of the neural network can also be improved thereby.

According to a further embodiment, a computer-implemented method for providing a trained function for improvement of a two-dimensional visualization image comprising a plurality of visualization pixels is provided. The method comprises:

providing training input data, wherein the training input data has a first visualization image of a three-dimensional object, which first visualization image was generated based upon volume data by an image synthesis algorithm with a first total computing effort, which volume data represents the three-dimensional object;

providing training output data, wherein the training output data has a second visualization image of the three-dimensional object, which second visualization image was generated based upon the volume data by the image synthesis algorithm with a second total computing effort, wherein the first total computing effort is lower than the second total computing effort;

generating an improved visualization image by applying the trained function to the training input data;

comparing the improved visualization image with the training output data; and adjusting the trained function based upon the comparison.

In at least one embodiment, the training method has the advantage that the training output data can be generated by the image synthesis algorithm by adjusting the parameters themselves. This makes it possible not only to match the trained function specifically to the image synthesis algorithm, but also ensures that training data sets can be generated in more or less any quantity, and this can significantly improve training of the trained function.

According to one embodiment, the step of providing the training input data can comprise, in particular, the following steps:

defining a focus area in the first visualization image, and mapping the volume data onto the visualization pixels of the first visualization image with the image synthesis algorithm in such a way that the computing effort for calculation of visualization pixels outside of the focus area is lower than for visualization pixels inside of the focus area.

According to one embodiment, the step of providing the training output data can comprise:

mapping the volume data onto the visualization pixels of the second visualization image with the image synthesis algorithm in such a way that all visualization pixels of the second visualization image at least are calculated with the computing effort of the visualization pixels inside of the focus area of the first visualization image.

According to a further embodiment, a training system for providing a trained function is provided, which is designed to carry out one or more method step(s) of an embodiment of the method for providing a trained function.

According to a further embodiment, a visualization device for visualization of a three-dimensional object represented by volume data is provided, wherein the visualization takes place for a user in the form of a two-dimensional visualization image comprising a plurality of visualization pixels. The device has an interface and an arithmetic unit. The interface is designed for receiving the volume data and detection information, which detection information includes information about the instantaneous viewing direction of the user. The arithmetic unit is designed to determine a focus area based upon the detection information, with the focus area being defined as a region of the visualization image, which the user focuses on. The arithmetic unit is also designed to map the volume data for creation of the visualization image onto the visualization pixels and to adjust the mapping in such a way that the computing effort for visualization pixels outside of the focus area is lower than for visualization pixels inside of the focus area.

The arithmetic unit can be designed as a central or decentral arithmetic unit. The arithmetic unit can have one or more processor(s). The processors can be designed as a central processing unit (CPU for short) and/or as a graphics processing unit (GPU for short). The arithmetic unit can be designed as what is known as a chip system ("system-on-a-chip", SoP for short), which controls all functions of a device. Alternatively, the arithmetic unit can be implemented as a local or Cloud-based processing server.

For mapping the volume data, the arithmetic unit can be designed to apply the image synthesis algorithm and to adapt it accordingly to the adjustment steps.

The interface can generally be designed for data exchange between the arithmetic device and further components. The interface can be implemented in the form of one or more individual data interface(s), which can have a hardware and/or software interface, for example a PCI bus, a USB interface, a FireWire interface, a ZigBee or Bluetooth interface. The interface can also have an interface of a communications network, wherein the communications network can have a Local Area Network (LAN), for example an intranet or a Wide Area Network (WAN). Accordingly, the one or more data interface(s) can have a LAN interface or a wireless LAN interface (WLAN or Wi-Fi).

The advantages of the proposed device substantially correspond to the advantages of the proposed method. Features, advantages or alternative embodiments can likewise be transferred to the other claimed subject matters, and vice versa.

According to a further embodiment, a visualization system is provided, which has the visualization device for visualization of a three-dimensional object represented by volume data. Furthermore, the visualization system has a detection device, which is designed to detect the detection information and provide it to the arithmetic unit via the interface.

According to one embodiment, the detection device has one or more optical detection device(s), in particular camera devices.

According to one embodiment, the visualization system has a reproduction device, which is designed to receive the visualization image from the arithmetic unit via the interface and display it for the user.

The reproduction device can have a screen device with one or more screens and/or a projection unit. The projection unit can be designed to project the visualization image onto a lens, which lies in the field of vision of the user.

According to one embodiment, the visualization system is designed as a "Wearable Device" and in particular as augmented reality glasses.

The invention relates in a further embodiment to a computer program product, which comprises a program and which can be loaded directly into a storage device of a programmable arithmetic unit and has program code/segments, for example libraries and help functions, in order to carry out a method for visualization of a three-dimensional object in particular according to an embodiment when the computer program product is run.

Furthermore, the invention relates in a further embodiment to a computer program product, which comprises a program and which can be loaded directly into a storage device of a programmable arithmetic unit and has program code/segments, for example libraries and help functions, in order to carry out a method for provision of a trained function in particular according to the embodiment when the computer program product is run.

The computer program products can comprise software with a source code, which still has to be compiled or which only has to be interpreted, or an executable software code, which for execution only has to be loaded into the provision unit. As a result of the computer program products the methods can be carried out quickly, repeatedly in an identical manner and robustly. The computer program products are configured such that they can carry out the inventive method steps via the arithmetic unit. The arithmetic unit has to have in each case the requirements such as an appropriate working memory, an appropriate processor, an appropriate graphics card or an appropriate logic unit, so the respective method steps can be efficiently carried out.

The computer program products are stored, for example, on a computer-readable storage medium or saved on a network or server from where they can be loaded into the processor of the respective arithmetic unit, which can be directly connected to the arithmetic unit or can be designed as part of the arithmetic unit. Furthermore, control information of the computer program products can be stored on a computer-readable storage medium. The control information of the computer-readable storage medium can be designed in such a way that it carries out an inventive method when the data carrier is used in an arithmetic unit. Examples of computer-readable storage medium are a DVD, a magnetic tape or a USB stick on which electronically readable control information, in particular software, is stored. If this control information is read from the data carrier and stored in an arithmetic unit, all inventive embodiments of the methods described above can be carried out. The invention can thus also start from the computer-readable medium and/or the computer-readable storage medium. The advantages of the proposed computer program products or the associated computer-readable media substantially correspond to the advantages of the proposed methods.

FIG. 1 shows a system 1 for visualization of a three-dimensional object according to one embodiment. The system 1 has an arithmetic unit 20, an interface 30, a detection device 40, a reproduction device 50 and a storage unit 60. The arithmetic unit 20 is basically designed for calculation of a visualization image VB of a three-dimensional object based upon volume data VD describing the three-dimensional object. The arithmetic unit 20 can be provided with the volume data VD from the storage unit 60 via the interface 30.

The storage unit 60 can be designed as a central or decentral database. The storage unit 60 can be, in particular, part of a server system. The storage unit 60 can be, in particular, part of what is known as a Picture Archiving and Communication System (PACS). The volume data VD can have been generated by a medical imaging method. For example, the volume data VD can have been generated by radiography, computed tomography (CT), magnetic resonance tomography (MR), ultrasound and/or Positron Emission Tomography (PET). The volume data VD can be formatted, for example, in the DICOM format. DICOM stands for Digital Imaging and Communications in Medicine and designates an open standard for the storage and exchange of information in medical image data management. The volume data VD has a three-dimensional data set comprising a plurality of volume pixels, what are known as voxels. The voxel values can be obtained, for example, by the medical imaging methods and conventionally represent a measure of the local density of the three-dimensional object at the location of the voxel. Providing the volume data VD can comprise, for example, loading the volume data VD into a working memory (not shown) of the arithmetic unit 20.

The arithmetic unit 20 is designed to take into account the viewing direction of the user on calculation of a visualization or mapping of the three-dimensional object. For this, the arithmetic unit 20 is provided with detection information EI via the interface 30, which detection information EI contains information about where the user is currently looking. The detection information EI is provided by the detection device 40. The detection device 40 is configured to detect the viewing direction of a user. For this, it can have optical detection device(s) such as cameras, which detect the eye area and/or the pupil position and/or the head position of the user. The detection information EI can then have, for example, image data of an eye area, a pupil position and/or a head position.

Once the visualization image VB has been calculated, it should be displayed to the user. For this, the reproduction device 50 is provided with the visualization image VB via the interface 30. The reproduction device 50 can have one or more screen unit(s) and/or projection unit(s), which are designed for reproduction of the visualization image VB for the user. In particular, the reproduction device 50 can be implemented as an image display system of augmented reality glasses. Alternatively, the reproduction device 50 can have a screen of a PC, laptop, tablet or smartphone.

The interface 30 can have one or more individual data interface(s), which guarantee the exchange of data between the components 20, 40, 50, 60 of the system 1. The one or more data interface(s) can have a hardware and/or software interface, for example a PCI bus, a USB interface, a FireWire interface, a ZigBee or a Bluetooth interface. The one or more data interface(s) can have an interface of a communications network, wherein the communications network can have a Local Area Network (LAN), for example an intranet or a Wide Area Network (WAN). Accordingly, the one or more data interface(s) can have a LAN interface or a wireless LAN interface (WLAN or Wi-Fi).

Preferably, the arithmetic unit 20, the interface 30, the detection device 40 and the reproduction device 50 are integrated in augmented reality glasses. The arithmetic unit 20 can then be designed as a processor of the augmented reality glasses. The data link for the storage unit 60 can be designed, in particular, as a wireless interface.

For calculation of the visualization image VB based upon the input data, the arithmetic unit 20 can have different elements 21, 22, 23 and 24. The element 21 can be understood as a focus area calculation module. Element 21 can implement or control an algorithm, which, based upon the detection information EI, is designed to calculate a focus area FB inside of the visualization image VB to which the user is currently directing his attention. For this, the detection information EI is evaluated by element 21 and related to the visualization image VB shown or to be shown. For this, for example a suitable registering—for instance between the detection device 40 and the reproduction device 50—can be used. The focus area FB can be defined as a region around a focus pixel FP on which the attention of the user is focused (cf. also FIGS. 3 and 5 in this regard).

The element 22 can be understood as a volume rendering engine. The element 22 can implement or control an image synthesis algorithm, which is designed to map volume data VD onto the visualization image VB or the pixels of the visualization image VB. The pixels of the visualization image VB will be called visualization pixels VP below. For calculation of the mapping onto the visualization pixels VP, the image synthesis algorithm can have different visualization modules, which can be selectively activated and deactivated, in particular, for each visualization pixel and/or can be set in terms of their computing effort. The visualization modules can relate, for example, to different approaches to calculation of a visualization image VB. For example, the image synthesis algorithm can comprise a ray casting module, wherein visualization pixels VP are calculated with the method of ray casting. Furthermore, the image synthesis algorithm can have a path tracing module, with visualization pixels being calculated according to the method of path tracing. In addition, the visualization modules can relate to supplementary mapping effects. These supplementary mapping effects can comprise, in particular with ray casting methods, for example effects of ambient occlusion, shadow effects, translucence effects, color bleeding effects, surface shadowing, complex camera effects and/or lighting effects due to any ambient light conditions. Overall the element 22 is thereby designed in such a way that the computing effort and therewith the quality of the mapping can be selectively set for each individual visualization pixel VP.

This property is used in element 23 to suitably adjust the computing effort per visualization pixel VP. The computing effort per visualization pixel VP is set such that in the focus area FB, a greater computing effort is provided per visualization pixel VP than outside. As a result an adequate quality of the mapping can be ensured inside of the focus area FB, while, at the same time, the total computing effort for the visualization image can be reduced.

The element 24 can be understood as a filter element. The element 24 is designed to apply an image filter to the visualization image VB calculated by the adjusted image synthesis algorithm in order to thereby compensate losses in quality or artifacts, which could emanate from the dynamic adjustment of the computing effort. The image filter can be implemented, in particular, as a trained function, which is designed to optically improve the visualization image VB.

The division of the arithmetic unit 20 into elements 21-24 that is undertaken serves merely for simpler explanation of the mode of operation of the arithmetic unit 20 and should not be understood as limiting. The elements 21-24 or their functions can also be combined into one element. The elements 21-24 can be understood, in particular, also as computer program products or computer program segments, which when run in the arithmetic unit 20 implement one or more of the method steps described below.

Figure 2:
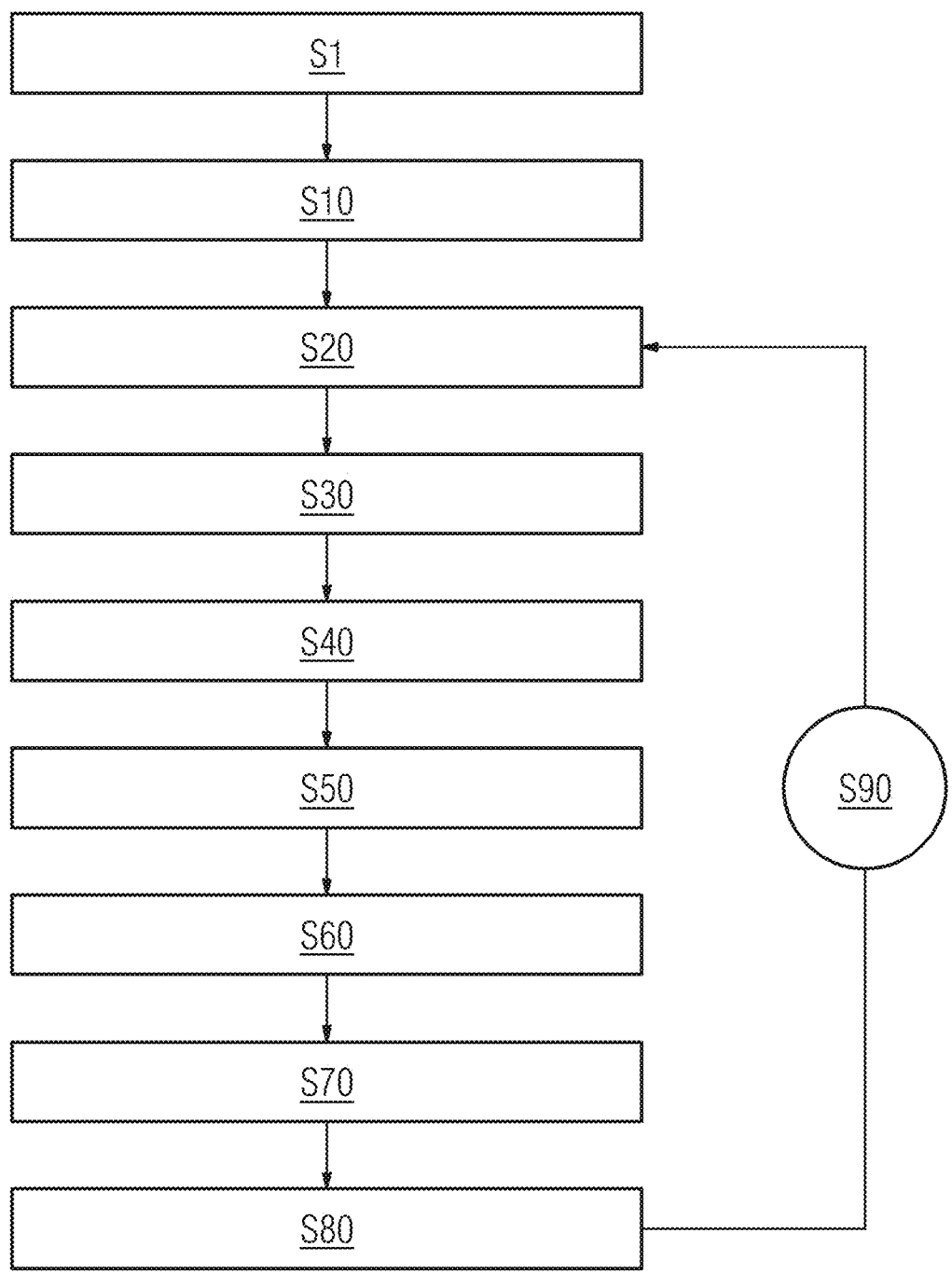
FIG. 2 shows a flowchart of a method for visualization of a three-dimensional object according to one embodiment.

FIG. 2 illustrates a schematic flowchart of a method for visualization of a three-dimensional object. The order of the method steps is limited neither by the illustrated sequence nor by the chosen numbering. The order of the steps can thus optionally be transposed and individual steps can be omitted.

A first, optional step S1 is directed toward providing the volume data VD. The provision can be implemented by a retrieval of the volume data VD from the storage unit 60 and/or loading of the volume data VD into the arithmetic unit 20.

A further, optional step S10 is directed toward providing the image synthesis algorithm. The provision can be implemented by providing and/or requesting the image synthesis algorithm in or from any storage device (for example the storage unit 60 or any internal storage device of the arithmetic unit 20) and/or loading of the image synthesis algorithm into the arithmetic unit 20.

In a next step S20, the instantaneous viewing direction of the user is detected. For this, firstly the detection information EI can be provided by the detection device 40, and this is then appropriately evaluated. Depending on the type of detection information EI this can occur, for example, with means of image evaluation. The instantaneous viewing direction can be based, in particular, on a display surface for the visualization image VB and on an instantaneously displayed visualization image VB or one that is to be displayed in the future, therefore. The instantaneous viewing direction thereby indicates to which point or which visualization pixel VP of the visualization image VB the user is currently directing or will direct his attention.

In a next step S30, a focus area FB in the visualization image VB is calculated based upon the detected instantaneous viewing direction. The focus area FB can be defined as the region around the focus pixel FP or also just as the focus pixel FP itself. The focus area FB is in particular circular; alternative forms are likewise conceivable, however.

Once the focus area FB is known, in a next step S40, the image synthesis algorithm is adjusted such that the computing effort per visualization pixel VP is dynamically adjusted to the instantaneous viewing direction of the user, the time budget for calculation of the visualization image VB and the available computing power. The adjustment takes place in such a way that for the focus area FB, a greater computing effort is permitted per visualization pixel VP than for visualization pixels VP outside. In particular, the computing effort per visualization pixel VP can be set such that the computing effort per visualization pixel VP decreases as the distance from the focus area FB increases. Various measures are taken for this in step S40. The measures can be taken, for example, on visualization modules implemented in the image synthesis algorithm and switch these on or off or limit them in terms of their quality. The visualization modules can be given different priorities, so visualization modules, which are less important for the representation quality than others are primarily limited in order to reduce the computing effort.

For example, the following measures can be taken, which can all be combined with each other:
reduction of the sampling frequency along simulated rays in the ray casting or path tracing as the distance from the focus area FB increases up to a minimum sampling frequency;
reduction of the sampling frequency of scattered rays in the path tracing as the distance from the focus area FB increases;
reduction of the sampling frequency of shadow rays as the distance from the focus area FB increases;

reduction of the ambient occlusion quality by reduction of the ambient occlusion test rays as the distance from the focus area FB increases;

reduction of the gradient quality for shading calculations as the distance from the focus area FB increases (from high to low): Higher-order Differences, Central Differences, Forward Differences);

reduction of the shading as the distance from the focus area FB increases;

reduction of the maximum number of scatter events in the path tracing as the distance from the focus area FB increases;

stoppage of shadow ray calculations from a certain distance from the focus area FB;

stoppage of ambient light occlusion calculations (Ambient Occlusion) from a certain distance from the focus area FB;

mixture of rendering methods as a function of a distance from the focus area FB, for example path tracing in the focus area FB, shaded ray casting outside of the focus area FB and unshaded ray casting (in other words, ray casting without shading) in the periphery;

reduction of the number of Monte Carlo iterations as the distance from the focus area FB increases with path tracing;

earlier early-ray termination (ending the sampling on reaching an opacity threshold) as the distance from the focus area FB increases from a certain distance; and/or use of lower resolution mipmap stages of the volume data texture as the distance from the focus area FB increases from a certain distance.

The intervals at which the above-mentioned measures are implemented can be adapted, moreover, as a function of the available time budget and the available computing power.

Figure 3:
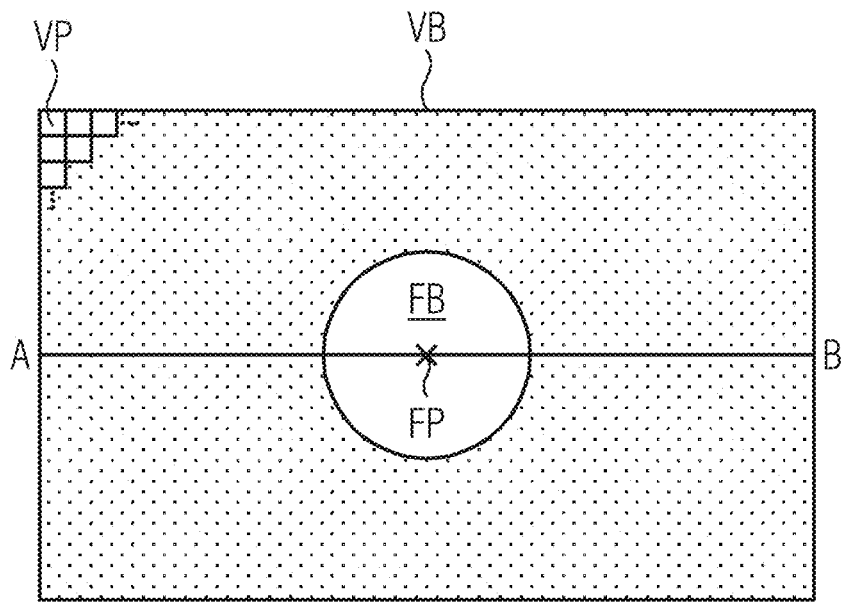
FIG. 3 shows a schematic visualization image of a three-dimensional object according to one embodiment.
Figure 4:
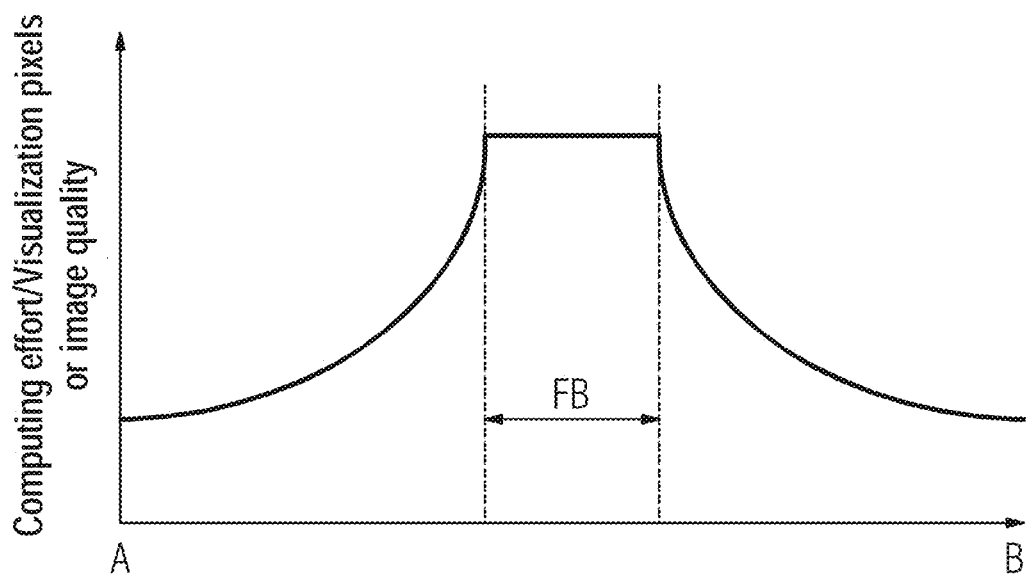
FIG. 4 shows a schematic course of an image quality or computing effort in cross-section through the visualization image shown in FIG. 3 along the line A-B.
Figure 5:
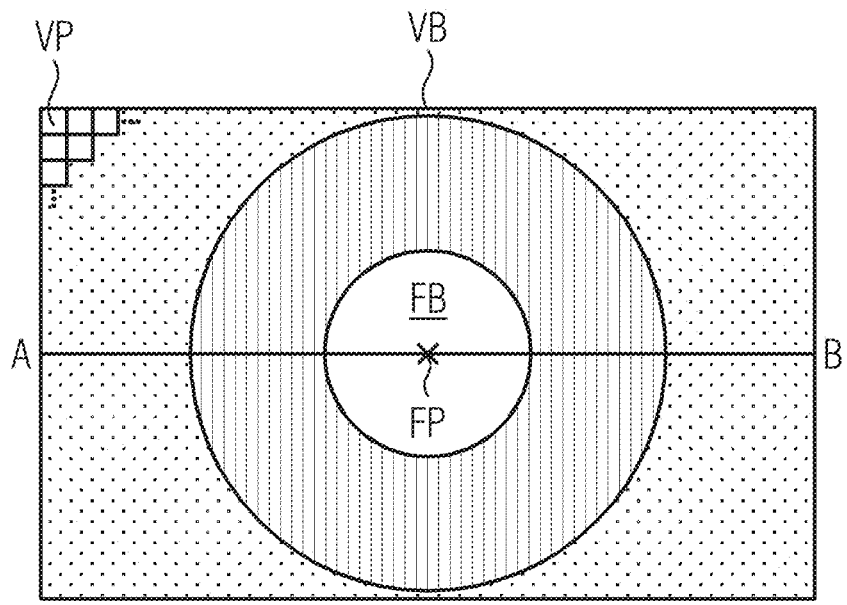
FIG. 5 shows a schematic visualization image of a three-dimensional object according to one embodiment.
Figure 6:
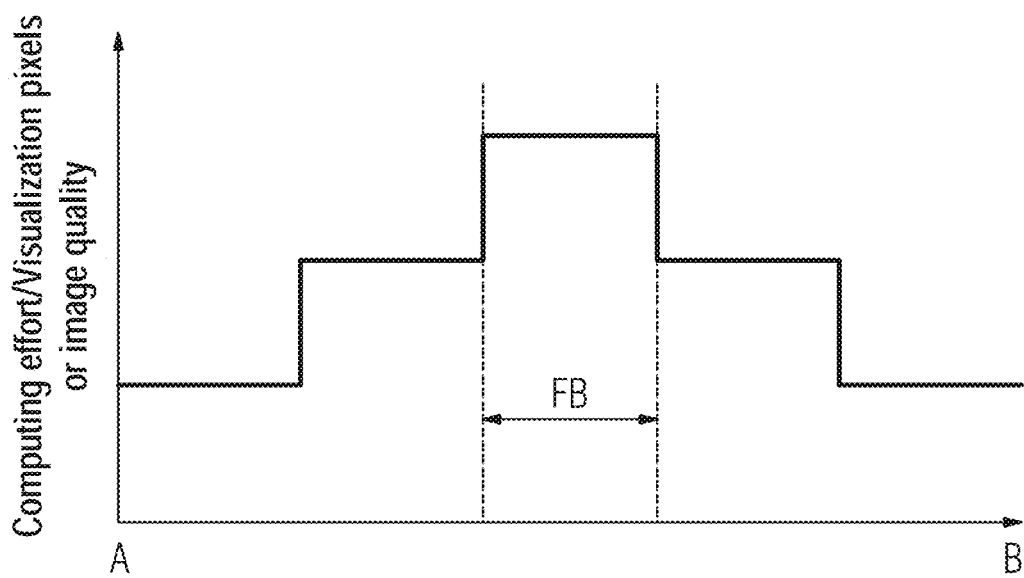
FIG. 6 shows a schematic course of an image quality or computing effort in cross-section through the visualization image shown in FIG. 5 along the line A-B.

In step S50, the visualization image VB is then created with the suitably adjusted image synthesis algorithm. FIGS. 3 and 5 show example visualization images. In accordance with the set computing effort per visualization pixel, the visualization images then have regions of differing quality. In general, the quality will be highest in the focus area FB and then decrease as the distance from the focus area FB increases. This is shown schematically in FIGS. 4 and 6. FIGS. 4 and 6 in each case show the course of the image quality or of the computing effort for a cross-section through the visualization image VB. FIG. 4 shows the cross-section along the line A-B in FIG. 3 and FIG. 6 the cross-section along the line A-B in FIG. 5. As may also be inferred from FIGS. 3 to 6, the decrease in the computing effort or the image quality can be configured to be continuous or abrupt. A combination of the two is also conceivable. A continuous decrease is obtained, for example, if a quality factor such as the sampling frequency is continuously reduced. Jumps in image quality and computing effort can be produced as a result of visualization modules and the effects modelled therewith being switched on or off from certain intervals, or different underlying mapping methods being alternated between from certain intervals. Of course, continuous decreases can assume different forms. Thus, for example, a linear, quadratic, exponential or logarithmic decrease can be implemented as a function of the distance from the focus area FB.

In order to at least partially compensate the losses in quality, artifacts or discontinuities, which result due to adjusting the computing effort, it is provided in step S60 that the visualization image VB generated in step S50 is processed by an image filter. The image filter can comprise a conventional image filter, such as a Gaussian filter and/or a low-pass filter and/or a bilinear filter. Furthermore, the image filter can have a trained function TF, which was trained for the improvement of visualization images VB, which was generated by viewing direction-specific adjusting of the computing effort. Step S60 is optional and can be omitted.

In step S70, the reproduction device 50 is provided with the complete visualization image VB via the interface 30. In step S80, the reproduction device 50 displays the visualization image VB to the user. Steps S70 and S80 are optional and can be omitted.

Step S90 is an optional repetition step. Once the visualization image VB has been displayed to the user, processing jumps via step S90 to step S20 again and the viewing direction of the user is detected once again. A new focus area FB is then calculated in step S30 on this basis and the visualization image VB updated in steps S40, S50 and optionally S60, S70 and S80. The calculation of the visualization image VB can be continuously updated with the instantaneous viewing direction of the user by way of the repetition step.

Figure 7:
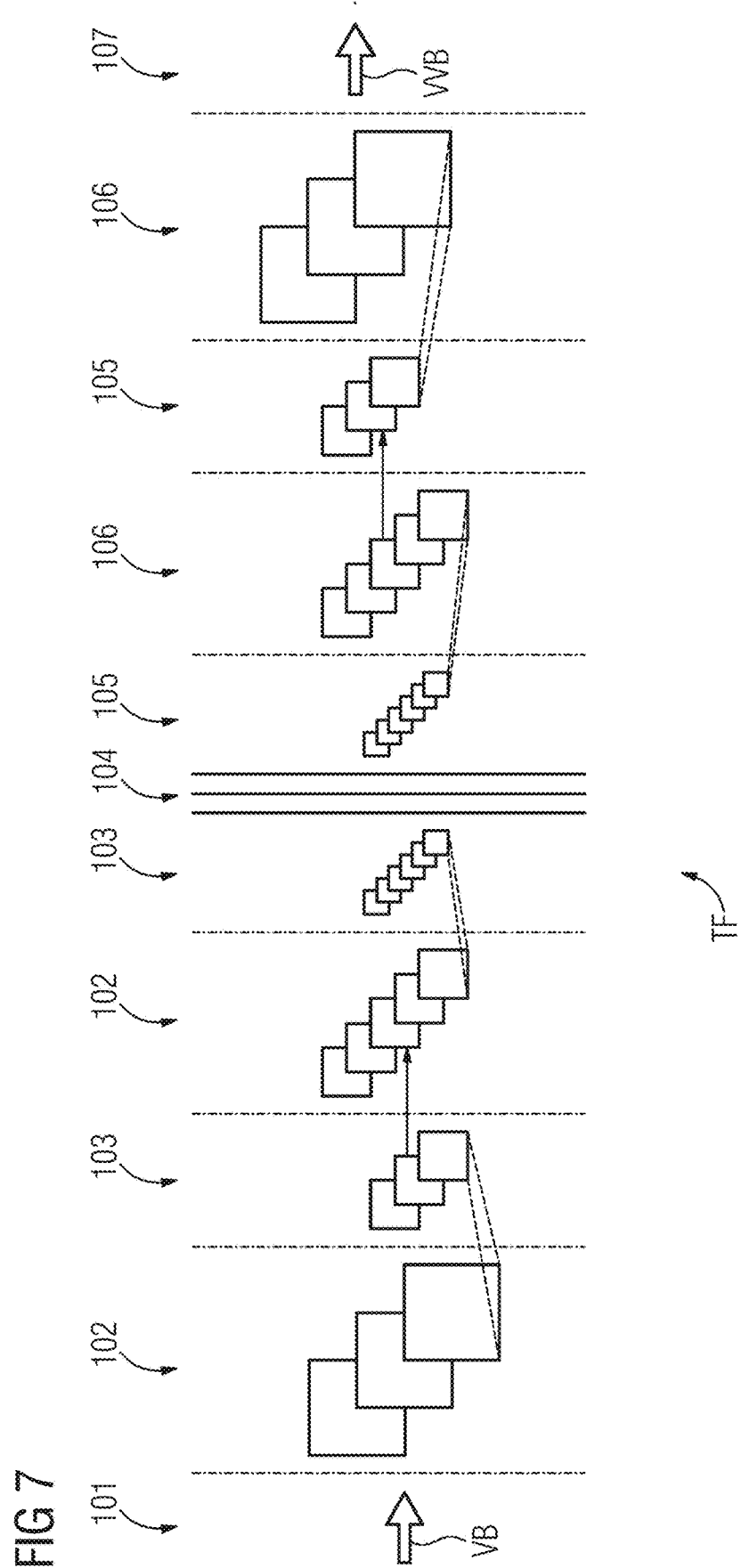
FIG. 7 shows a trained function for generating an improved visualization image.

FIG. 7 shows an example representation of a trained function TF, as can be used in step S60 for improvement of a visualization image VB. The trained function TF can be designed as an image-to-image network 100, which is trained to identify and optimally compensate the effects, which inevitably result in the visualization image VB due to adjusting the computing effort in step S40. The trained function TF receives the visualization image VB generated in step S50 as an input and provides an improved visualization image VVB as an output on this basis. According to one embodiment, the trained function TF has a neural network and, in particular, a convolutional neural network (or CNN for short) or a deep convolutional neural network. The trained function TF then has one or more convolutional layer(s) and one or more deconvolutional layer(s).

As shown in FIG. 7, the trained function TF can have as a neural network a large number of successive layers 101-107. Each layer comprises at least one, preferably a plurality of node(s). Each node can substantially be viewed such that it performs a mathematical operation, which assigns an output value to one or more input value(s). The nodes of each layer can be connected to all or only a partial quantity of nodes of a preceding and/or subsequent layer. Two nodes are "connected" if their inputs and/or outputs are connected. The edges or connections are associated with a parameter, which is frequently referred to as "weight" or "edge weight". In the example shown in FIG. 7, layer 101 is the input layer. Input values for the nodes of layer 101 are preferably the visualization pixels VP of the visualization image VB. The layer 107 is the output layer. Output values of the nodes of the output layer 107 can be pixel values of the improved visualization image VBB. A number of hidden layers 102-106 is located between the input 101 and the output layer 107. Different layers can be used, such as convolutional layers 102, pooling layers 103, up-sampling layers 105, deconvolutional layers 106, or what are known as fully connected layers 104. Convolutional levels convolute the input and pass its result to the next level in that an image filter is moved via the input. The pooling layers 103 reduce the dimensions of the data in that outputs of node groups of a layer are combined on a single node in the next layer. In order to reconstruct the improved visualization image VVB, the up-sampling layers 105 and the deconvolutional layers 106 implement the actions of the convolutional layers 102 and the pooling layers 103. Fully connected layers 104 connect each node of preceding layers with nodes of subsequent layers, so substantially each node is given a "voice".

The trained function TF learns by adjusting weights or weighting parameters (for example the edge weights) of individual layers and nodes. The trained function TF can be trained, for example, by methods of supervised learning. Here, for example the method of back propagation can be used. During the training the trained function TF is applied to training input data to generate corresponding output values whose target values are known in the form of training output data. The difference between the output values and the training output data can be used to introduce a cost or loss functional as a measure of how well or badly the trained function TF fulfils the task assigned to it. The aim of the training is to find a (local) minimum of the cost functional in that the parameters (for example the edge weights) of the trained function TF are iteratively adjusted. The trained function TF is finally rendered capable of supplying acceptable results by way of a (sufficiently) large cohort of training input data. This optimization problem can be carried out using a stochastic gradient descent or other approaches known in the field.

Figure 8:
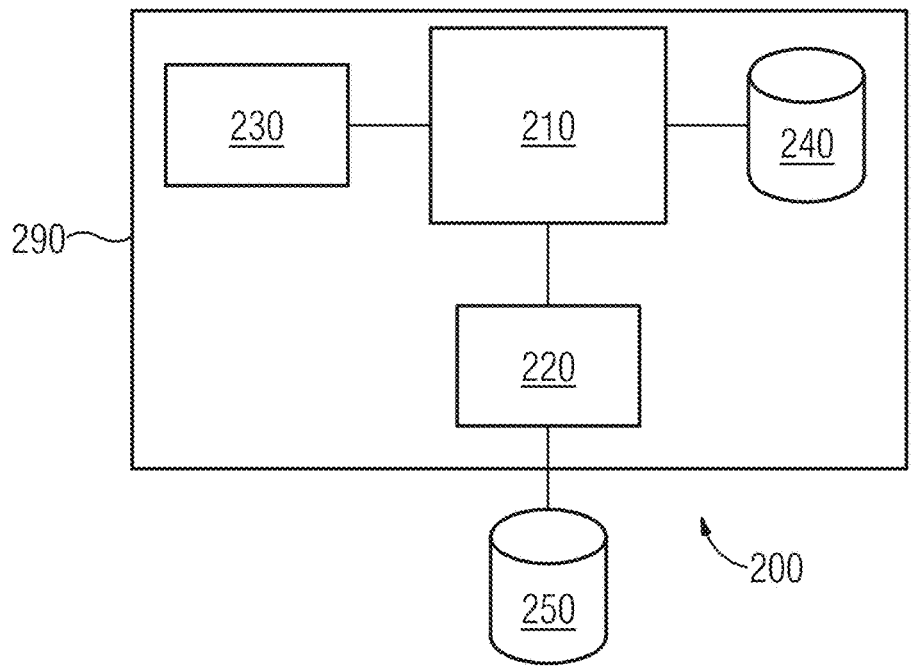
FIG. 8 shows a schematic representation of an embodiment of a system for providing the trained function.

FIG. 8 shows an embodiment of a system 200 for training or providing the trained function TF. The system comprises a processor 210, an interface 220, a working memory 230, a storage device 240 and a database 250. The processor 210, the interface 220, the working memory 230 and the storage device 240 can be designed as a computer 290. The processor 210 controls the operation of the computer 290 during training of the trained function TF. In particular, the processor 210 can be designed in such a way that it carries out the method steps illustrated in FIG. 9. The instructions can be stored in the working memory 230 or in the storage device 240 and/or loaded into the working memory 230 when execution of the instructions is desired. The storage device 240 can be designed as a local storage device or a remote storage device which can be accessed via a network. The method steps illustrated in FIG. 9 can be defined by computer program products, which are stored in the working memory 230 and/or the storage device 240.

The database 250 can be implemented as a Cloud storage device or local storage device, which is connected to the computer 290 via the wireless or wired interface 220. The database 250 can also be, in particular, part of the computer 290. The database 250 is used as an archive for the (training) volume data T-VD and/or the first and second visualization images T-VB-1, T-VB-2 derived therefrom. Furthermore, the database 250 can serve as an archive for one or more trained function(s) TF.

Figure 9:
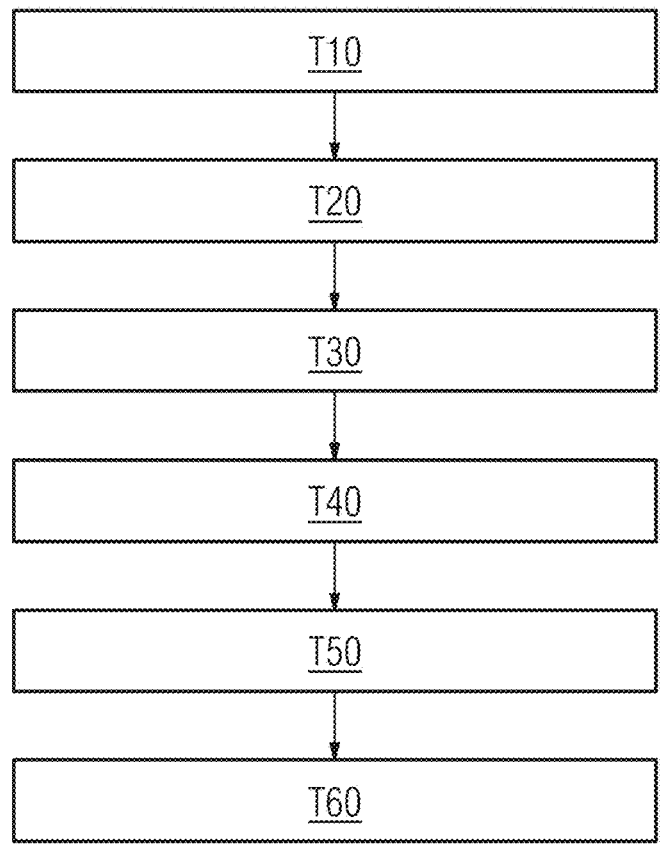
FIG. 9 shows a flowchart of a method for provision of a trained function for improvement of a visualization image of a three-dimensional object according to one embodiment.

FIG. 9 shows a schematic flowchart of a method for provision of a trained function TF for improvement of a visualization image VB. The order of the method steps is limited neither by the illustrated sequence nor by the chosen numbering. Thus the order of the steps can optionally be transposed and individual steps can be omitted.

A first step T10 is directed toward providing a trained function TF. The processor 210 can be provided with the trained function TF from the database 250 via the interface 220. The trained function TF can already be pre-trained, in other words, one or more parameter(s) of the trained function TF have already been adjusted by the described training method and/or a different training method. Alternatively, the one or more parameter(s) of the trained function can have not yet been adjusted by way of training data, in particular the one or more parameter(s) can be pre-assigned by a constant value and/or by a random value. In particular, all parameters of the trained function TF can have not yet been adjusted by way of training data, in particular all parameters can be pre-assigned by a constant value and/or by a random value.

A second step T20 is directed toward providing training input data. Since the trained function TF should in use qualitatively improve visualization images VB, whose computing effort was optimized by taking into account a focus area FB, suitable training input data is precisely such visualization images VB. These visualization images VB will hereinafter be called first visualization images T-VB-1. According to one implementation, these first visualization images T-VB-1 can be synthetically generated based upon (training) volume data T-VD. The training volume data T-VD corresponds in terms of its type substantially to the volume data VD. A focus area can be artificially defined for the creation of a first visualization image T-VB-1. "Artificial" can mean that the focus area is not based on actual viewing direction of a user but is arbitrarily, and in particular randomly, defined. Mapping of the training volume data T-VD onto the visualization pixels VP of the first visualization image T-VB-1 then takes place by way of the image synthesis algorithm, and, more precisely, in such a way that the computing effort for calculation of visualization pixels VP outside of the focus area FB is lower than for visualization pixels VP inside of the focus area FB. In particular the method steps described in connection with FIG. 2 can be used. A 'simulated' first visualization image T-VB-1 is thus obtained with a drop in quality from the focus area FB through to the peripheral regions of the first visualization image T-VB-1. To improve the data basis for training the trained function TF, firstly a plurality of different training volume data sets T-VD can be used. Secondly, a plurality of differently arranged focus areas VB can be defined per training volume data set T-VD. Furthermore, the measures inside of the image synthesis algorithm can be varied for setting the computing effort per visualization pixel VP for different first visualization images T-VB-1. The first visualization images T-VB-1 thereby show losses in quality, artifacts and possibly discontinuities, as can also occur in practice in the method described in respect of FIGS. 2 to 6. The first visualization images T-VB-1 can be provided at the processor 210 by retrieving pre-produced first visualization images T-VB-1 from the database 250 via the interface 220. Alternatively, the first visualization images T-VB-1 can be generated by the processor 210 ad hoc based upon the training volume data T-VD. In this case, the processor 210 can be provided with the training volume data T-VD via the interface 220.

Step T30 is directed toward providing training output data. The training output data is likewise visualization images VB, which will hereinafter also be called second visualization images T-VB-2. The second visualization images T-VB-2 are target images, which indicate to the trained function TF in which direction the first visualization images T-VB-1 should be optimally improved. A second visualization image T-VB-2 is assigned to each first visualization image T-VB-1. The second visualization images T-VB-2 are likewise generated based upon the training volume data T-VD by way of the image synthesis algorithm. However, the image synthesis algorithm is not subject to any restrictions in respect of the computing effort. Instead, the second visualization images T-VB-2 are generated by the image synthesis algorithm preferably with substantially the same (high) computing effort for all visualization pixels VP. The second visualization images T-VB-2 are generated in particular with a greater total computing effort than the first visualization images T-VB-1. The second visualization images T-VB-2 can be provided at the processor 210 by retrieving pre-produced second visualization images T-VB-2 from the database 250 via the interface 220. Alternatively, the second visualization images T-VB-2 can be generated by the processor 210 ad hoc based upon the training volume data T-VD. In this case, the processor 210 can be provided with the training volume data T-VD via the interface 220.

In a next step T40, the training input data, in other words, the first visualization images T-VB-1, are input into the trained function. On this basis the trained function TF calculates improved visualization images VVB in which the effects of the adjustments of the image synthesis algorithm should be optimally corrected.

In a next step T50, the improved visualization images VVB are compared with the associated second visualization images T-VB-2. The trained function TF can then be adjusted in step T60 based upon this comparison. This can take place, for example, based upon a cost functional, which penalizes deviations of the improved visualization image VVB from the second visualization images T-VB-2. One or more parameter(s) of the trained function TF can then be adjusted, in particular, such that the cost functional is minimized, for example by way of a back propagation. In one embodiment, the cost functional can be based on a pixel-wise difference of the improved visualization image VVB and of the second visualization image T-VB-2, for example on the total of the quadratic deviations. For minimization of the cost functional, different paired sets of improved visualization images VVB and second visualization images T-VB-2 can be compared until a local minimum of the cost functional is reached and the trained function TF is operating satisfactorily.

Where it has not yet explicitly occurred but is expedient and within the meaning of the invention, individual example embodiments, individual partial aspects or features thereof can be combined with each other or transposed without departing from the scope of this invention. Advantages of the invention described with reference to one example embodiment also apply, where transferable, without explicit mention to other example embodiments.

The following points are likewise part of the disclosure:
1. A computer-implemented method for visualization of a three-dimensional object represented by volume data (VD) for a user in the form of a two-dimensional visualization image (VB) comprising a plurality of visualization pixels (VP), wherein the method has the following steps:
    providing (S10) an image synthesis algorithm, which image synthesis algorithm is designed for visualization of the three-dimensional object by mapping the volume data (VD) onto the visualization pixels (VP);
    detecting (S20) an instantaneous viewing direction of the user;
    determining (S30) a focus area (FB), wherein the focus area (FB) is defined as a region of the visualization image (VB), which the user focuses on based upon the instantaneous viewing direction;
    adjusting (S40) the image synthesis algorithm in such a way that the computing effort required for the mapping for visualization pixels (VP) outside of the focus area (FB) is lower than for visualization pixels (VP) inside of the focus area (FB); and
    mapping (S50) the volume data (VD) onto the visualization pixels (VP) with the adjusted image synthesis algorithm in order to generate the visualization image (VB) thereby.

2. The method as claimed in 1, also with the step:
    displaying (S80) the visualization image (VB) in a user interface (40).
3. The method as claimed in one of the preceding points, wherein:
    the steps of detecting (S20), of determining (S30), of adjusting (S40), of mapping (S50) and, optionally, of displaying (S80) are performed several times one after the other in a loop.
4. The method as claimed in one of the preceding points, wherein:
    the image synthesis algorithm has a ray casting and/or a path tracing method; and
    adjusting the image synthesis algorithm comprises adjusting the sampling rate of the volume data (VD) along the rays simulated according to the ray casting and/or path tracing method.
5. The method as claimed in one of the preceding points, wherein:
    in the image synthesis algorithm, a plurality of different visualization modules is implemented, which different visualization modules, during mapping of the volume data (VD), take into account, in each case different mapping effects;
    the image synthesis algorithm has, in particular, a ray casting method; and
    in the step of adjusting (S40), the different visualization modules are selectively adjusted and/or selectively activated and/or deactivated.
6. The method as claimed in 5, wherein:
    a prioritization is allocated to the visualization modules; and
    in the step of the adjusting (S40), the selective adjusting and/or activating and/or deactivating takes place based upon the prioritization.
7. The method as claimed in 5 or 6, wherein the mapping effects are selected from:
    ambient occlusion, shadows, translucence, color bleeding, surface shading, complex camera effects and/or consideration of any ambient light conditions.
8. The method as claimed in one of the preceding points, wherein:
    the step of adjusting (S40) comprises adjusting the gradient quality in shading calculations.
9. The method as claimed in one of the preceding points, wherein:
    the image synthesis algorithm has a ray casting method; and
    the step of adjusting comprises:
        adjusting the number of ambient occlusion test rays per sampling point determined according to the ray casting method; and/or
        adjusting the number of shadow rays per sampling point determined according to the ray casting method.
10. The method as claimed in one of the preceding points, wherein:
    the image synthesis algorithm has a path tracing method; and
    the step of adjusting comprises:
        adjusting a number of scatter events per ray simulated according to the path tracing method; and/or
        adjusting the number of rays simulated according to the path tracing method, which are sampled per visualization pixel (VP).
11. A computer-implemented method for visualization of a three-dimensional object represented by volume data (VD) for a user in the form of a two-dimensional visualization image (VB), wherein the method has the following steps:

providing (S10) an image synthesis algorithm, which image synthesis algorithm is designed for visualization of the three-dimensional object by mapping the volume data (VD) onto the visualization image (VB);

detecting (S20) an instantaneous viewing direction of the user;

determining (S30) a focus area (FB), wherein the focus area (FB) is defined as a region of the visualization image (VB), which the user focuses on based upon the instantaneous viewing direction;

adjusting (S40) the image synthesis algorithm in such a way that an image quality of the visualization image (VB) outside of the focus area (FB) is lower than inside of the focus area (FB); and mapping (S50) the volume data (VD) onto the visualization pixels (VP) with the adjusted image synthesis algorithm.

12. The method as claimed in 11, wherein:
in the step of adjusting (S40), the image synthesis algorithm is adjusted in such a way that the image quality decreases as the distance from the focus area (FB) increases, and, more precisely, in particular continuously and/or discontinuously at least in certain sections.

13. A computer-implemented method for providing a trained function (TF) for improvement of a two-dimensional visualization image (VB) comprising a plurality of visualization pixels (VP), which visualization image (VB) maps a three-dimensional object represented by volume data (VD);

wherein the method has the following steps:
providing (T20) a first visualization image (T-VB-1) of the three-dimensional object, which first visualization image (T-VB-1) was generated by an image synthesis algorithm by mapping the volume data (VD) onto the visualization pixels (VP) with a first total computing effort;

providing (T30) a second visualization image (T-VB-2) of the three-dimensional object, which second visualization image (T-VB-2) was generated by the image synthesis algorithm by mapping the volume data (VD) onto the visualization pixels (VP) with a second total computing effort, wherein the first total computing effort is lower than the second total computing effort;

generating (T40) an improved visualization image (VBB) by applying the trained function (TF) to the first visualization image (T-VB-1);

comparing (T50) the improved visualization image (VBB) with the second visualization image (T-VB-2); and adjusting (T60) the trained function (TF) based upon the comparison.

14. The method as claimed in 13, wherein the step of providing (T20) the first visualization image (T-VB-1) comprises:
defining a focus area (FB) in respect of the first visualization image (T-VB-1); and mapping the volume data (VD) onto the visualization pixels (VP) of the first visualization image (T-VB-1) with the image synthesis algorithm in such a way that the computing effort for calculation of visualization pixels (VP) outside of the focus area (FB) is lower than for visualization pixels (VP) inside of the focus area (FB).

15. The method as claimed in 14, wherein the step of providing the second visualization image comprises:
mapping the volume data (VD) onto the visualization pixels (VP) of the second visualization image (T-VB-2) with the image synthesis algorithm in such a way that all visualization pixels (VP) of the second visualization image (T-VB-2) are calculated at least with the computing effort for the visualization pixels (VP) inside of the focus area (FB) of the first visualization image (T-VB-1).

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for visualization of a three-dimensional object represented by volume data as a two-dimensional visualization image, the two-dimensional visualization image including a plurality of visualization pixels, and the method comprising:

detecting an instantaneous viewing direction of a user;

determining a focus area of the two-dimensional visualization image on which the user focuses based on the instantaneous viewing direction, a first subset of visualization pixels being in the focus area, a second subset of visualization pixels being outside of the focus area, and the plurality of visualization pixels including the first subset of visualization pixels and the second subset of visualization pixels;

adjusting an image synthesis algorithm to produce an adjusted image synthesis algorithm, the image synthesis algorithm being configured for visualization of the three-dimensional object by mapping the volume data onto the visualization pixels, the adjusting being performed such that a computing effort required for mapping the volume data onto the second subset of visualization pixels is lower than a computing effort required for mapping the volume data onto the first subset of visualization pixels; and mapping the volume data onto the plurality of visualization pixels with the adjusted image synthesis algorithm, the plurality of visualization pixels having a uniform spatial resolution across both the first subset of visualization pixels and the second subset of visualization pixels, wherein the method further comprises adapting a resolution of the volume data such that the mapping includes mapping a first resolution of the volume data onto the first subset of visualization pixels and mapping a second resolution of the volume data onto the second subset of visualization pixels, the second resolution being lower than the first resolution.

2. The method of claim 1, wherein the adjusting comprises:

adjusting the image synthesis algorithm such that a computing effort required for mapping the volume data onto a respective pixel among the plurality of visualization pixels decreases as a distance of the respective pixel from the focus area increases.

3. The method of claim 2, wherein at least one of:

the computing effort required for mapping the volume data onto the respective pixel continuously decreases as the distance of the respective pixel from the focus area increases; or the computing effort required for mapping the volume data onto the respective pixel discontinuously decreases as the distance from the focus area increases.

4. The method of claim 1, wherein the image synthesis algorithm includes a first mapping algorithm and a second mapping algorithm, the second mapping algorithm being different from the first mapping algorithm; and the adjusting adjusts the image synthesis algorithm such that the first mapping algorithm is configured to map the volume data onto the first subset of visualization pixels, and the second mapping algorithm is configured to map the volume data onto the second subset of visualization pixels.

5. The method of claim 4, wherein the first mapping algorithm implements a path tracing method; and the second mapping algorithm implements a ray casting method.

6. The method of claim 1, wherein the image synthesis algorithm is based on tracing of simulated rays in an object volume spanned by the volume data; and the adjusting of the image synthesis algorithm includes adjusting a rate at which the object volume is sampled along the simulated rays.

7. The method of claim 1, wherein the image synthesis algorithm is configured to implement a plurality of different visualization modules, each of the plurality of different visualization modules corresponding to a different mapping effects for the mapping; and the adjusting comprises at least one of selectively adjusting, selectively activating, or selectively deactivating at least one among the plurality of different visualization modules.

8. The method of claim 7, wherein a prioritization is allocated to the plurality of different visualization modules; and the at least one of selectively adjusting, selectively activating or selectively deactivating takes place based on the prioritization.

9. The method of claim 1, wherein:

the adjusting includes adjusting a shading quality of the image synthesis algorithm.

10. The method of claim 1, wherein the adjusting includes adjusting a first rendering algorithm and a second rendering algorithm, the second rendering algorithm being different from the first rendering algorithm, and the adjusted image synthesis algorithm including both the adjusted first rendering algorithm and the adjusted second rendering algorithm; and the mapping includes first mapping the volume data onto the visualization pixels in the focus area using the adjusted first rendering algorithm, and second mapping the volume data onto the visualization pixels outside of the focus area using the adjusted second rendering algorithm.

11. The method of claim 1, wherein the adjusting comprises:

determining at least one of a time budget or an available computing power for the mapping; and adjusting the image synthesis algorithm based on the at least one of time budget or available computing power.

12. The method of claim 1, further comprising:

applying a trained function to the two-dimensional visualization image after the mapping, the trained function being configured to improve an image quality of the two-dimensional visualization image.

13. The method of claim 12, wherein the trained function is configured to improve the image quality of the two-dimensional visualization image by a correction of effects of the adjusting of the image synthesis algorithm.

14. The method of claim 1, further comprising:

applying a filter algorithm to the two-dimensional visualization image after the mapping, the filter algorithm including at least one of Gaussian, bilinear, or low-pass filter elements.

15. A visualization system for visualization of a three-dimensional object represented by volume data as a two-dimensional visualization image, the two-dimensional visualization image including a plurality of visualization pixels, and the visualization system comprising:

at least one processor configured to determine a focus area based on detection information, the focus area being a region of the two-dimensional visualization image on which a user focuses, and the detection information including an instantaneous viewing direction of the user, map the volume data onto the plurality of visualization pixels to create the visualization image, the plurality of visualization pixels including a first subset of visualization pixels and a second subset of visualization pixels, the first subset of visualization pixels being in the focus area, the second subset of visualization pixels being outside of the focus area, and the plurality of visualization pixels having a uniform spatial resolution across both the first subset of visualization pixels and the second subset of visualization pixels, adjust the mapping of the volume data onto the plurality of visualization pixels such that a computing effort required for mapping the volume data onto the second subset of visualization pixels is lower than a computing effort required for mapping the volume data onto the first subset visualization pixels, and adapt a resolution of the volume data such that the mapping includes mapping a first resolution of the volume data onto the first subset of visualization pixels and mapping a second resolution of the volume data onto the second subset of visualization pixels, the second resolution being lower than the first resolution.

16. A non-transitory computer program product storing a computer program, which can be loaded directly into a storage device of a visualization system, including program segments to carry out the method for visualization of a three-dimensional object of claim 1 when the program segments are run by the visualization system.

17. A non-transitory computer-readable storage medium storing program segments, readable and runable by a visualization system, to carry out the method for visualization of a three-dimensional object of claim 1 when the program segments are run by the visualization system.

18. The visualization system of claim 15, wherein the at least one processor is configured to adjust the mapping of the volume data onto the plurality of visualization pixels such that a computing effort required for mapping the volume data onto a respective pixel among the plurality of visualization pixels decreases as a distance of the respective pixel from the focus area increases.

19. The visualization system of claim 18, wherein at least one of:

the computing effort required for mapping the volume data onto the respective pixel continuously decreases as the distance of the respective pixel from the focus area increases; or the computing effort required for mapping the volume data onto the respective pixel discontinuously decreases, as the distance of the respective pixel from the focus area increases.

20. The visualization system of claim 15, wherein the at least one processor is configured to:

map the volume data onto the plurality of visualization pixels with an image synthesis algorithm, the image synthesis algorithm including a first mapping algorithm and a second mapping algorithm, and the second mapping algorithm being different from the first mapping algorithm; and adjust the mapping of the volume data onto the plurality of visualization pixels by adjusting the image synthesis algorithm such that first mapping algorithm is configured to map the volume data onto the first subset of visualization pixels, and the second mapping algorithm is configured to map the volume data onto the second subset of visualization pixels.

21. The visualization system of claim 20, wherein the first mapping algorithm implements a path tracing method; and the second mapping algorithm implements a ray casting method.

* * * * *